G. H. BAEHR.
TRAP.
APPLICATION FILED DEC. 28, 1912.
1,057,401.
Patented Apr. 1, 1913.
2 SHEETS—SHEET 1.
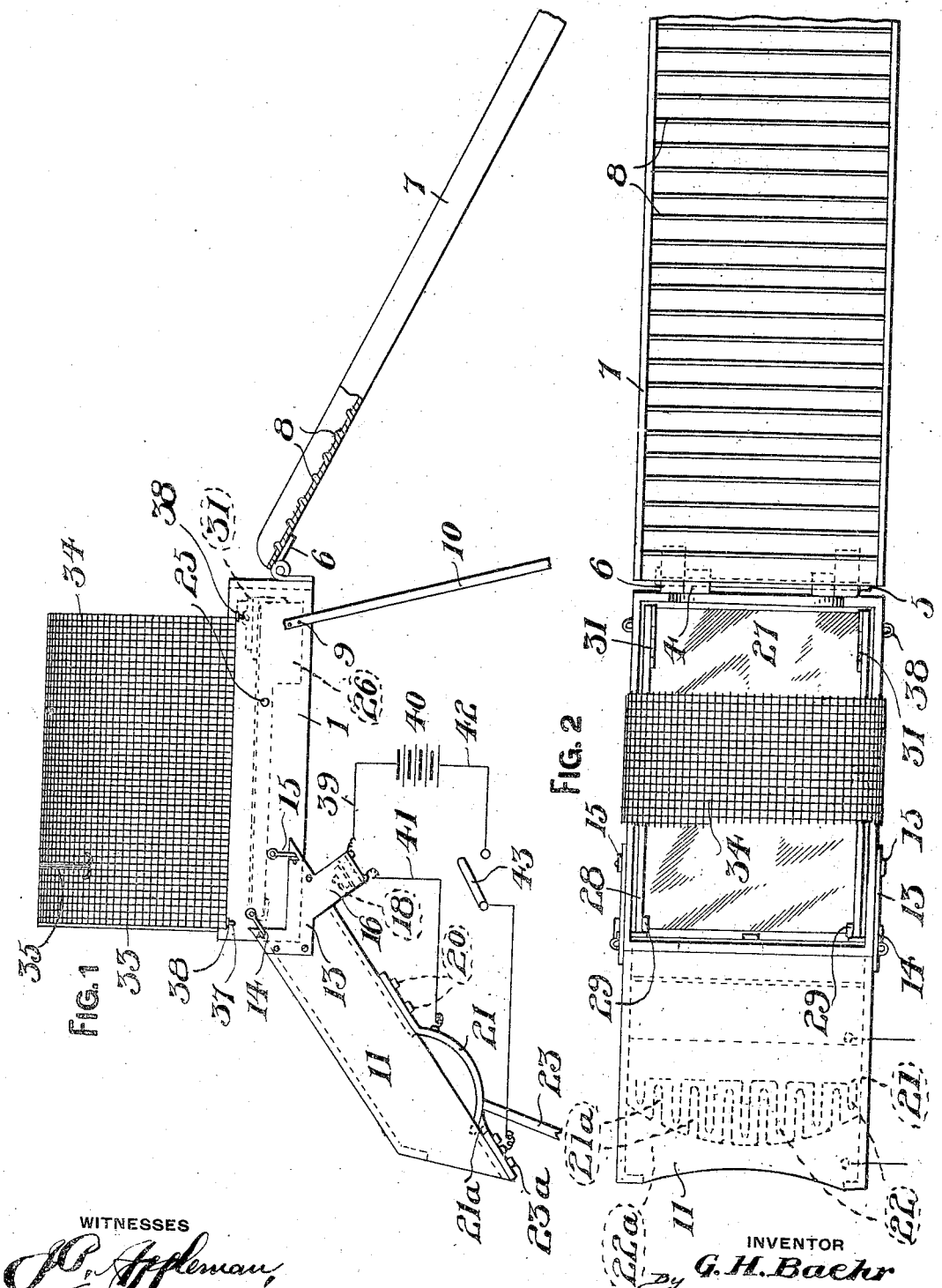
WITNESSES
INVENTOR
G. H. Baehr
ATTORNEYS

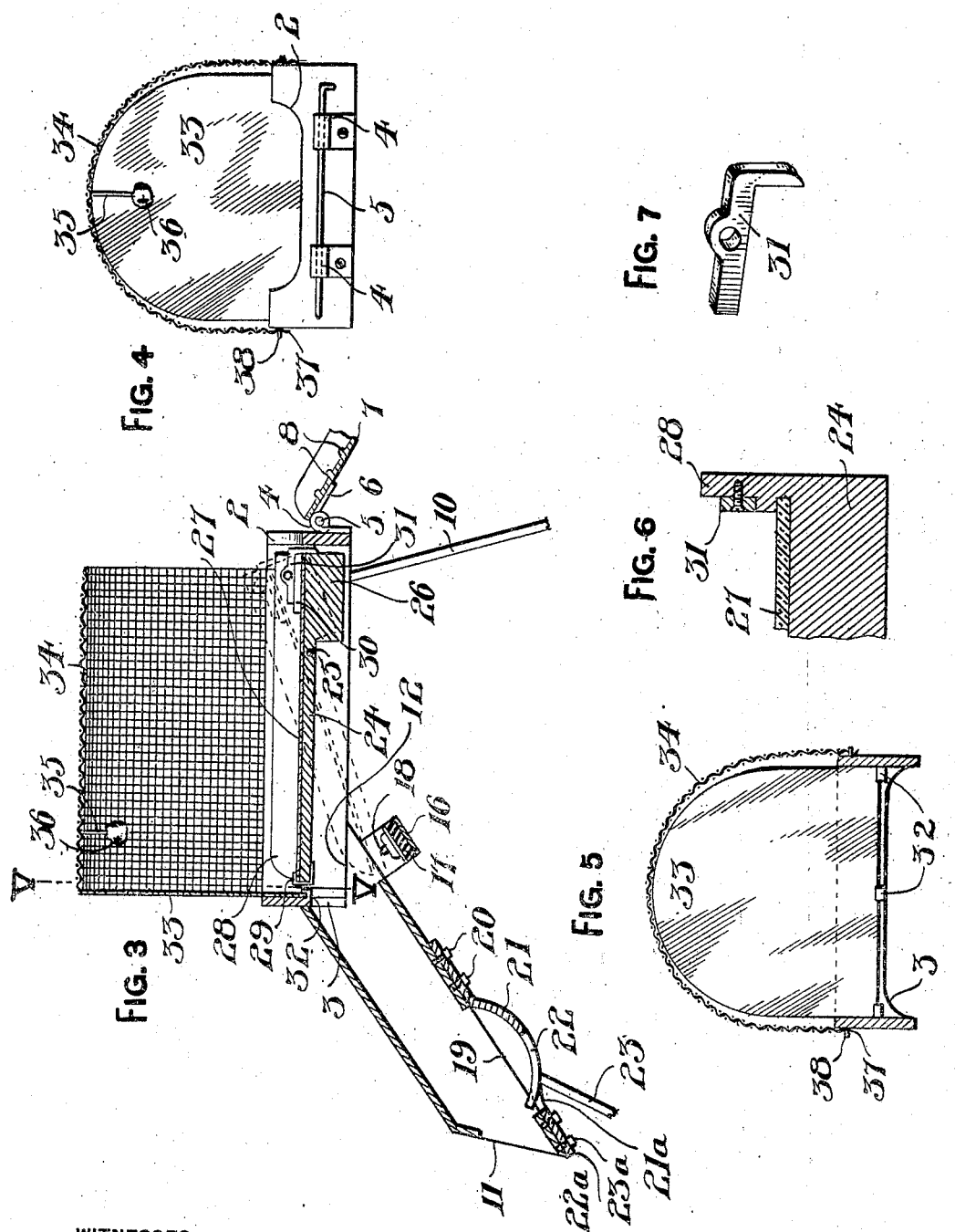

UNITED STATES PATENT OFFICE.

GUSTAV HERMANN BAEHR, OF BALTIMORE, MARYLAND.

TRAP.

1,057,401.  Specification of Letters Patent.  Patented Apr. 1, 1913.

Application filed December 28, 1912. Serial No. 739,105.

*To all whom it may concern:*

Be it known that I, GUSTAV HERMANN BAEHR, a subject of the King of Bavaria, residing at Baltimore, in the State of Maryland, have invented certain new and useful Improvements in Traps, of which the following is a specification, reference being had therein to the accompanying drawing.

This invention relates to traps, and the objects of my invention are, first, to utilize electricity for exterminating rats or other rodents entering the trap; second, to provide a trap that can be safely used in wharves, ware-houses and other buildings; third, to provide a trap that will discharge the bodies from the trap as fast as they are exterminated, and fourth, to accomplish the above results by a mechanical construction that is simple, durable and efficient for the purposes for which it is intended.

With the above and other objects in view the invention resides in a novel construction, combination and arrangement of parts to be hereinafter specifically described and then claimed.

Reference will now be had to the drawings, wherein like numerals of reference designate corresponding parts throughout the several views, in which:—

Figure 1 is a side elevation of the trap, Fig. 2 is a plan of the same partly broken away, Fig. 3 is a longitudinal sectional view of a portion of the trap, Fig. 4 is an end view of a portion of the trap, Fig. 5 is a cross sectional view taken on the line V—V of Fig. 3, Fig. 6 is an enlarged cross sectional view of a portion of the platform, and Fig. 7 is a perspective view of a detached plate holder.

A trap in accordance with this invention comprises a rectangular frame 1 having the forward upper edge thereof cut away, as at 2 and the rear lower edge cut away, as at 3. The forward end of the frame 1 is provided with barrels 4 and connected to said barrels by a transverse pin 5 are the barrels 6 of a gang-plank 7, said gang-plank having transverse cleats or footholds 8. Connected to the outer sides of the frame 1 at the forward end thereof by screws or other fastening means 9 are angularly disposed legs 10. Connected to the rear end of the frame 1 is an angularly disposed chute 11 having the upper end thereof cut away, as at 12 to fit the rear end of the frame 1. The outer sides of the chute, at the upper end thereof, are provided with side plates 13 and these plates have eyes 14 adapted to receive pivoted hooks 15 carried by the outer sides of the frame 1. The plates 13 are provided with a depending yoke 16 supporting a transverse bar 17 of insulation, and mounted centrally of said bar is a conventional form of push button or switch 18.

The bottom of the chute 11 is cut away, as at 19 and secured to the bottom of the chute by screws or other fastening means 20 is a curved resilient contact member 21 having tines 22. The endmost tines are provided with angularly disposed legs 23 coöperating with the legs 10 in supporting the trap. Secured to the lower end of the chute 11 by screws 23ª is a contact member 22ª having tines 21ª that extend between the tines 22 of the member 21.

Trunnioned in the frame 1 is a tiltable platform 24, said platform being tiltably supported by a transverse pin 25 extending into the side walls of the frame 1. The platform 24 has the forward end thereof weighted or enlarged, as at 26 to normally support the platform in a horizontal position. Mounted upon the platform 24 is a reflector plate or mirror 27, said plate being held between the said walls 28 of the platform, a clip 29 arranged at the rear end thereof and cleats 30 carried by the walls 28 at the forward end of the platform. The plate 27 is locked upon the platform 24 by an angle holder 31 secured to the inner sides of the walls 28.

The inner side of the rear wall of the frame 1 is provided with a bracket 32 for a vertical reflector plate or mirror 33 having the upper edge thereof rounded. This mirror coöperates with the mirror 27 in deceiving a rat or other rodent when the platform 24 is occupied by a rodent.

The side walls of the frame 1 support the lower edges of a cage 34 and said cage adjacent to the mirror 33 is provided with a depending bait holder 35 for a bait 36. The cage 34 is preferably arch shaped and the ends thereof are reinforced by wires 37 that engage in staples 38, carried by the outer side walls of the frame 1.

The electrical connections of the trap are as follows:—A suitable source of electrical energy, as a generator or series of batteries are used, in the latter instance, the batteries being stepped up to produce a current of sufficient voltage, for instance over 500 volts, for electrocuting a rodent. The source of electrical energy is designated as 40 and is connected by a wire 39 to the push button 18. The push button 18 is connected by a wire 41 to the resilient contact member 21. The source of electrical energy is connected by a wire 42 to the stationary contact member 22ᵃ and interposed upon the wire 42 is a switch 43.

When a rat or other rodent passes over the fulcrumed point of the tiltable platform 24, the platform is immediately lowered to precipitate the rat into the chute 11, and as the rat encounters the contact members 21 and 22ᵃ, these members are charged by an electric circuit being completed through the source of electrical energy 40 due to an actuation of the push button 18 by the platform 24 impinging the same and by the rat's body connecting the members 21 and 22ᵃ. The tiltable platform 24 is restored to its normal position by the weighted end thereof.

The trap has been made of separable parts whereby it can be packed into a comparatively small parcel and sold in connection with a mail order business.

What I claim is:—

1. In a trap, the combination with a suitable source of electrical energy, of a rectangular frame, a gangway connected to said frame, a chute detachably connected to said frame, a push button supported by the upper end of said chute and in circuit with said source of electrical energy, a resilient contact member carried by the lower end of said chute and in circuit with one side of said source of electrical energy and said push button, a stationary contact member at the lower end of said chute and in circuit with the other side of said source of electrical energy and maintaining a normally open circuit adapted to be completed by a rat's body connecting said contact members, a platform trunnioned in said frame and adapted to actuate said push button by the weight of a rat's body, a mirror mounted upon said platform, a mirror carried by the rear end of said frame, and a cage supported by said frame.

2. In a trap, a rectangular frame, an inclined gangway leading to one end of said frame, a tilting platform pivoted within said frame and having its upper surface formed as a reflecting surface, a canopy extending over said frame and having one end closed by a mirror, the opposite end being open and facing the end of the gangway, a bait holder carried by the canopy, and an inclined chute leading from said frame and normally closed by said platform, said chute being recessed to receive the platform when tilting to cause the rodent to be discharged into the chute, said recessed portion forming a stop to limit the tilting platform.

In testimony whereof I affix my signature in presence of two witnesses.

GUSTAV HERMANN BAEHR.

Witnesses:
ROBERT E. BLADES,
J. M. CARTER.

Copies of this patent may be obtained for five cents each, by addressing the "Commissioner of Patents, Washington, D. C."